US009223040B2

(12) United States Patent
Phillips et al.

(10) Patent No.: US 9,223,040 B2
(45) Date of Patent: Dec. 29, 2015

(54) METHOD OF SEISMIC SOURCE SYNCHRONIZATION

(71) Applicant: INOVA, LTD, Grand Cayman (KY)

(72) Inventors: Thomas Phillips, Richmond, TX (US); Bernard Maechler, Sugar Land, TX (US); Keith Radcliffe, Meadows Place, TX (US); Igor Samoylov, Stafford, TX (US)

(73) Assignee: INOVA LTD., George Town, Grand Cayman (KY)

( * ) Notice: Subject to any disclaimer, the term of this patent is extended or adjusted under 35 U.S.C. 154(b) by 384 days.

(21) Appl. No.: 13/763,359

(22) Filed: Feb. 8, 2013

(65) Prior Publication Data

US 2013/0208563 A1    Aug. 15, 2013

Related U.S. Application Data

(60) Provisional application No. 61/596,729, filed on Feb. 9, 2012.

(51) Int. Cl.
*G01V 1/06* (2006.01)
*G01V 1/00* (2006.01)

(52) U.S. Cl.
CPC ........ *G01V 1/06* (2013.01); *G01V 1/003* (2013.01); *G01V 2200/12* (2013.01)

(58) Field of Classification Search
USPC .......................................... 367/14
See application file for complete search history.

(56) References Cited

U.S. PATENT DOCUMENTS

| 5,548,562 | A | 8/1996 | Helgerud et al. | |
|---|---|---|---|---|
| 6,002,339 | A | 12/1999 | Norris | |
| 6,188,962 | B1* | 2/2001 | Morgan et al. | 702/14 |
| 7,117,094 | B2* | 10/2006 | Fenton | 702/14 |
| 7,269,095 | B2* | 9/2007 | Chamberlain et al. | 367/76 |
| 7,526,386 | B2* | 4/2009 | Fenton | 702/14 |
| 7,639,567 | B2 | 12/2009 | Sitton et al. | |
| 7,969,819 | B2 | 6/2011 | Hall et al. | |
| 8,077,547 | B2* | 12/2011 | Morgan et al. | 367/61 |
| 8,559,267 | B2* | 10/2013 | Tulett et al. | 367/24 |
| 8,605,543 | B2* | 12/2013 | Ray et al. | 367/51 |
| 2004/0105341 | A1* | 6/2004 | Chamberlain et al. | 367/21 |
| 2005/0033519 | A1* | 2/2005 | Fenton | 702/14 |
| 2007/0253289 | A1* | 11/2007 | Chamberlain et al. | 367/51 |
| 2008/0189044 | A1 | 8/2008 | Chamberlain et al. | |
| 2008/0205191 | A1* | 8/2008 | Coste et al. | 367/15 |
| 2008/0217057 | A1* | 9/2008 | Hall et al. | 175/1 |
| 2009/0073805 | A1 | 3/2009 | Tulett et al. | |

(Continued)

FOREIGN PATENT DOCUMENTS

EP    0967494 A2    12/1999
WO    2012047394 A2    4/2012

OTHER PUBLICATIONS

PCT/US2013/025411—International Search Report dated Apr. 19, 2013.

*Primary Examiner* — James Hulka
(74) *Attorney, Agent, or Firm* — Mossman, Kumar & Tyler PC

(57) ABSTRACT

A method of controlling seismic data acquisition includes synchronizing a sampling rate of at least one node configured to acquire seismic data with a GPS timing signal from a first GPS seismic device; and delaying sending a start signal to one or more seismic sources, the delay being with reference to a GPS timing signal from a second GPS device.

12 Claims, 3 Drawing Sheets

(56) References Cited

U.S. PATENT DOCUMENTS

| | | |
|---|---|---|
| 2009/0073807 A1* | 3/2009 | Sitton et al. .................. 367/38 |
| 2009/0080290 A1 | 3/2009 | Ray et al. |
| 2010/0080081 A1 | 4/2010 | Morgan et al. |
| 2011/0013482 A1* | 1/2011 | Eick et al. .................. 367/38 |
| 2013/0044566 A1* | 2/2013 | Kimura et al. .................. 367/25 |

* cited by examiner

METHOD OF SEISMIC SOURCE SYNCHRONIZATION

CROSS REFERENCE TO RELATED APPLICATIONS

This application claims priority from U.S. Provisional Application Ser. No. 61/596,729, filed Feb. 9, 2012, the disclosure of which is fully incorporated herein by reference in its entirety.

BACKGROUND OF THE DISCLOSURE

1. Field of the Disclosure

This disclosure relates generally to systems and methods that employ synchronization protocols to enhance seismic data acquisition activities.

2. Background of the Art

Seismic surveys are conducted to map subsurface structures to identify and develop oil and gas reservoirs. Seismic surveys are typically performed to estimate the location and quantities of oil and gas fields prior to developing (drilling wells) the fields and also to determine the changes in the reservoir over time subsequent to the drilling of wells. On land, seismic surveys are conducted by deploying an array of seismic sensors (also referred to as seismic receivers) over selected geographical regions. The seismic sensors (geophones or accelerometers) are placed or coupled to the ground in the form of a grid. An energy source is used at selected spaced apart locations in the geographical area to generate or induce acoustic waves or signals (also referred to as acoustic energy) into the subsurface. The acoustic waves generated into the subsurface reflect back to the surface from subsurface formation discontinuities, such as those formed by oil and gas reservoirs. The reflections are sensed or detected at the surface by the seismic sensors and recorded. The sensing, processing and recording of the seismic waves is referred to as seismic data acquisition. Two-dimensional and/or three-dimensional maps of the subsurface structures (also referred to as the "seismic image") are generated from the recorded seismic data. These maps are then used to make decisions about drilling locations, reservoir size, pay zone depth and estimates of the production of hydrocarbons.

The present disclosure provides synchronization methods for facilitating seismic activity.

SUMMARY OF THE DISCLOSURE

In aspects, the present disclosure provides systems, methods, and products for controlling seismic data acquisition. The method includes synchronizing a sampling rate of at least one node configured to acquire seismic data with a GPS timing signal from a first GPS seismic device; and delaying sending a start signal to one or more seismic sources, the delay being with reference to a GPS timing signal from a second GPS device. In aspects, a machine-readable medium product may have instructions thereon, that when executed by at least one processor, causes the at least one processor to perform methods herein for controlling seismic data acquisition communication.

An amount of delay may be determined using a multiple of the sampling rate. The sampling rate may be defined by time boundaries. The method may also include synchronizing the time boundaries with the GPS timing signal and/or sending the start signal to the one or more seismic sources at the occurrence of a time boundary.

System aspects may include at least one node configured to acquire seismic data from at least one seismic sensor, the at least one node configured to synchronize a sampling rate of the node with a GPS timing signal from a first GPS seismic device; and a seismic source encoder configured to delay sending a start signal to one or more seismic sources, the delay being with reference to a GPS timing signal from a second GPS device.

Examples of certain features of the systems, methods and apparatus disclosed herein have been summarized rather broadly in order that detailed description thereof that follows may be better understood, and in order that the contributions to the art may be appreciated. There are, of course, additional features of the disclosure that will be described hereinafter and will form the subject of the disclosure. The summary provided herein is not intended to limit the scope.

BRIEF DESCRIPTION OF THE DRAWINGS

The novel features of this disclosure, as well as the disclosure itself, will be best understood from the attached drawings, taken along with the following description, in which similar reference characters generally refer to similar elements, and in which.

DETAILED DESCRIPTION OF THE EMBODIMENTS

The present disclosure relates to devices and methods for controlling activities relating to seismic data acquisition. The present disclosure may be implemented in embodiments of different forms. The drawings shown and the descriptions provided herein correspond to certain specific embodiments of the present disclosure for the purposes of explanation of the concepts contained in the disclosure with the understanding that the present disclosure is to be considered an exemplification of the principles of the disclosure, and is not intended to limit the scope of the disclosure to the illustrated drawings and the description herein.

As will be discussed in greater detail below, the present disclosure provides methods for synchronizing the start of one or more seismic sources with a recorder and via a communication protocol transmitted by hard wire and/or wirelessly. The communication protocol may use an analog or digital protocol or method of synchronization. A protocol may be transmitted from an encoder (e.g., a seismic recording system, a source control software running on a processor) and/or generated from a seismic source encoder.

Figure 1:
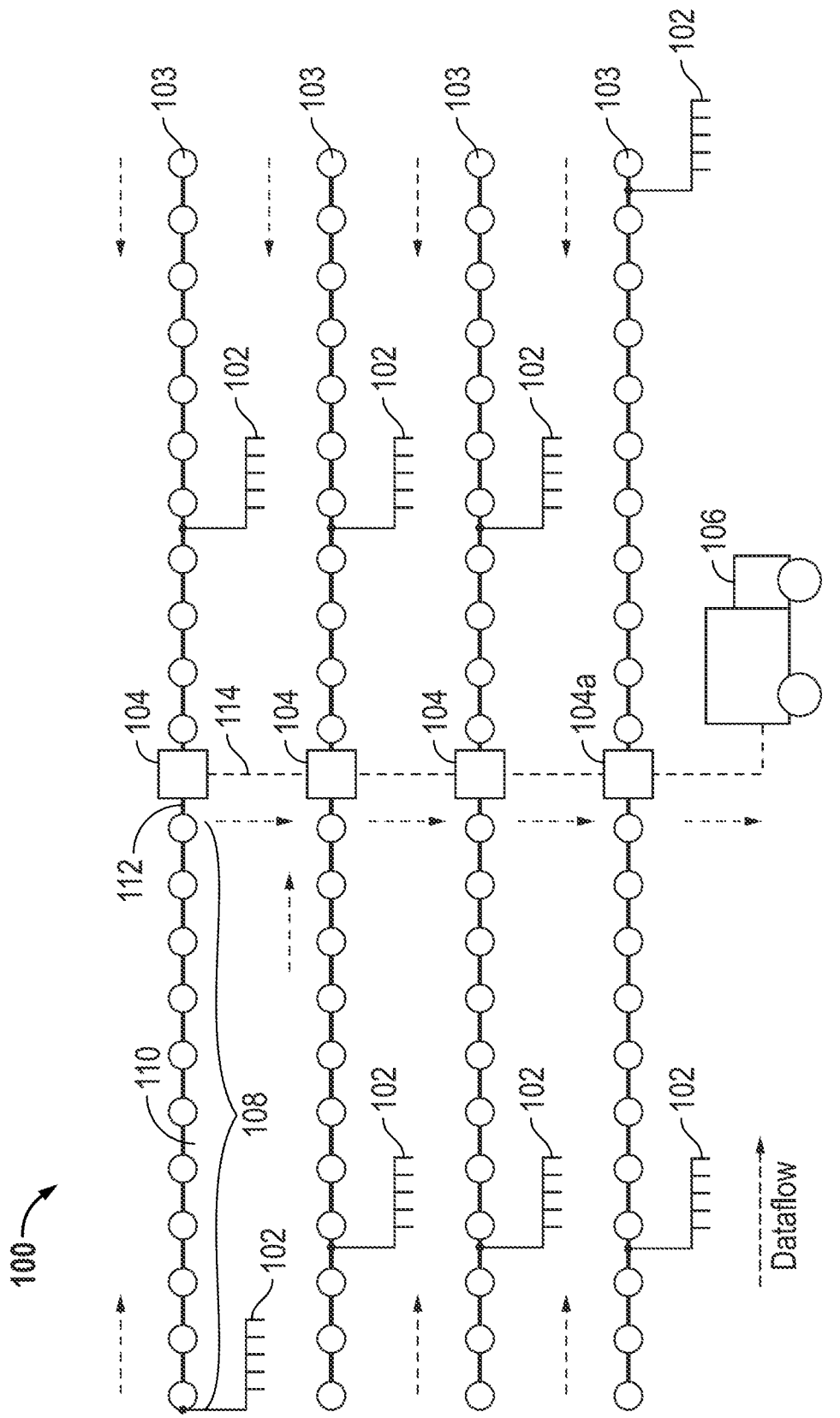
FIG. 1 shows a cable seismic data acquisition system that may utilize the disclosed communication protocols.
Figure 2:
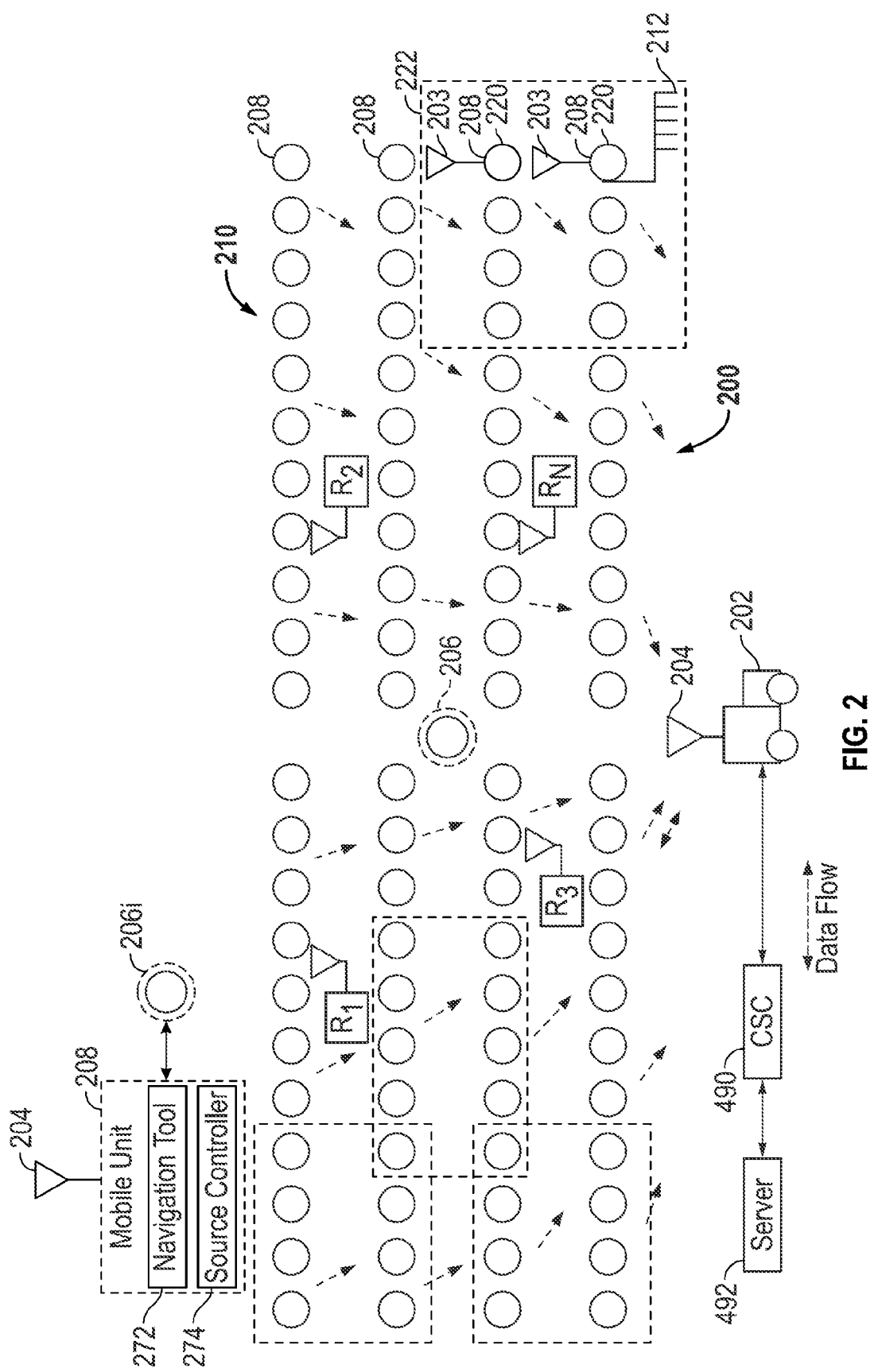
FIG. 2 is a representation of a wireless seismic data acquisition system that may use the disclosed communication protocols.

FIGS. 1 and 2 depict illustrative, but not exclusive, seismic data acquisition systems that may implement the methods of the present disclosure. The basic components of these systems are discussed in greater detail below. Thereafter, the methods for controlling/synchronizing communications for these systems are described FIG. 1 depicts a conventional cable seismic data acquisition system 100. Such a system includes an array (string) of spaced-apart seismic sensor units 102. Each string of sensors is typically coupled via cabling to a data acquisition device 103, and several of the data acquisition devices and associated string of sensors are coupled via cabling 110 to form a line 108, which is then coupled via cabling 112 to a line tap or (crossline unit) 104. Several crossline units 104 and associated lines are usually coupled together by cabling, such as shown by the dotted line 114. The sensors 102 are usually spaced between 10-50 meters. Each of the crossline units 104 typically performs some signal processing and then stores the processed signals as seismic information. The crossline units 104 are each typically coupled, either in parallel or in series, with one of the units 104a serving as an interface between the central controller or control unit (CU) 106 and all crossline units 104. This system may used wired communication media, e.g., RS232, Ethernet, RS485, USB, etc.

Referring to FIG. 2, a representation of a wireless seismic data acquisition system 200 is shown according to one embodiment of the present disclosure. The system 200 includes a central controller or control unit (CU) 202 in data communication with each of a number of wireless field station units (FSU) or sensor stations 208 forming an array (spread) 210 for seismic data acquisition. The wireless communication between the central controller 202 with the FSUs may be direct bi-directional wireless communication or via an intermediate unit such as a repeater unit (RU)(not shown). Each sensor station 208 includes one or more sensors 212 for sensing seismic energy. The sensors 212 may be any suitable seismic sensors, including geophones, and one or more component accelerometers.

Direct communication as used herein refers to individualized data flow as depicted in FIG. 2 by dashed arrows. A wireless communication system can be a VHF, UHF, WiFi, or other wireless radio communication system. The data flow can be bi-directional to allow one or more of: transmission of command and control instructions from the central controller 202 to each wireless sensor station 208; exchange of quality control and other data between the central controller 202 and each wireless sensor station 208; and transmission of status signals, operating conditions and/or selected pre-processed seismic information from each wireless sensor station 208 to the central controller 202. The communication might be in the form of radio signals transmitted from and received by the sensor stations 208 and central controller 202 via suitable antennas 203 and 204 respectively.

In an active mode, the system 200 uses one or more seismic energy sources 206 to generate seismic energy of known characteristics, such as magnitude, frequency etc., at known locations in the seismic spread to impart seismic energy into the subterranean formation. A representative seismic energy source is designated with numeral 206i. Typically, activation (or more commonly, "shooting" or "firing") of the source 206i is initiated locally by a mobile unit 270.

One illustrative energy source is a vibrator truck. Vibrator trucks support a heavy base plate that is connected to an inertia mass. The inertia mass contains a linear actuator that reciprocates the base plate along a vertical or horizontal axis in reaction to the momentum of the inertia mass. The reciprocating base plate injects a vibratory wave train into the earth. A programmable controller controls the force and frequency of the signal generated by the inertia mass.

Another illustrative energy source is an accelerated weight-drop truck. A weight-drop truck is a vehicle mounted ground impact which can used to provide the seismic source. A heavy weight is raised by a hoist at the back of the truck and dropped, possibly about three meters, to impact (or "thump") the ground. To augment the signal, the weight may be dropped more than once at the same spot, the signal may also be increased by thumping at several nearby places in an array whose dimensions may be chosen to enhance the seismic signal by spatial filtering.

Still other illustrative energy sources include explosive sources, such as dynamite, and compressed gas source. It should be understood, however, that any device that generates usable seismic energy may be an energy source.

In one embodiment, an operator in the mobile unit 270 utilizes a navigation tool 272 to navigate to a selected source location and using a source controller 274 operates the vibrator associated with the mobile unit to impart seismic energy into the subterranean formation. In another aspect, a mobile unit may be used to controllably fire explosive sources. To navigate the terrain and to determine the precise location coordinates of the source, the navigation tool 272 can be equipped with a global positioning satellite (GPS) device and/or a database having predetermined coordinates for each of the locations at which the source is to be activated. The source controller 274 can be programmed to receive and transmit information such as instructions to make the source 206i ready for firing, fire the source 206i, provide data indicative of the location of the mobile unit 270, the arming status of the source 206i, and data such as return shot attributes.

The central controller 202, the central station computer (CSC) 260 and a central server 280 exert control over the constituent components of the system 200 and direct activities of the operators and devices during the operation of the system 200. The server 280 can be programmed to manage data and activities over the span of the seismic surveying activities, which can include daily shooting sequences, updating the shots acquired, tracking shooting assets, storing seismic data, pre-processing seismic data and broadcasting corrections. CSC 260 may be integral with the CU 202. The central controller 202 also may act as a central radio unit. For large fields, radio antennas and repeater transceivers may also be deployed at selected field locations as described below.

As will be discussed in greater detail below, operating methods in accordance with the present disclosure synchronize the source and recorder operation when conducting seismic surveys. The synchronization methods of the present disclosure may be used with the systems such as those described above, or other similar seismic data acquisition systems. The basic components for synchronizing seismic operations are shown in FIG. 3.

Figure 3:
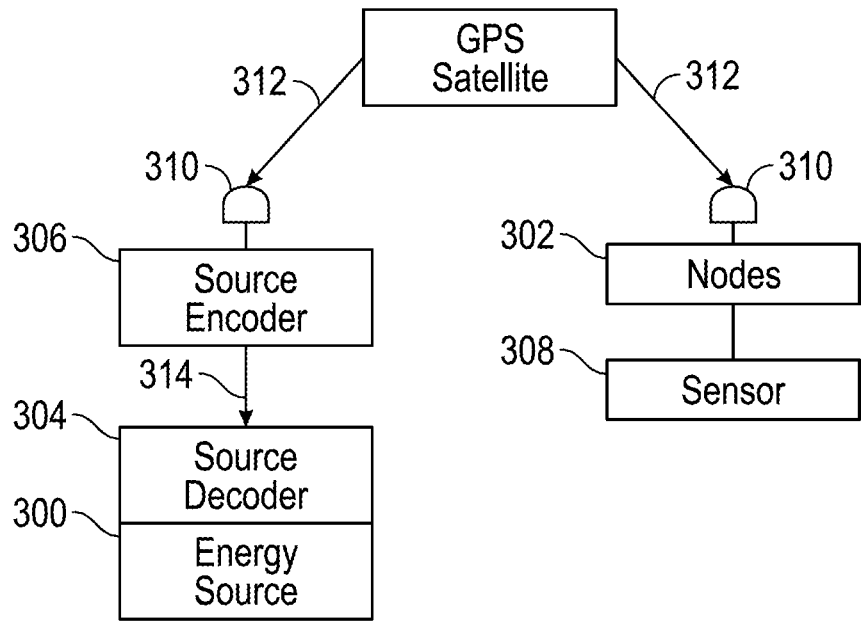
FIG. 3 shows an exemplary source and node configured for synchronization according to one embodiment of the present disclosure.

FIG. 3 schematically illustrates an exemplary energy source 300 and an exemplary node 302. It should be understood that a seismic spread may include tens or hundreds of sources 300 and nodes 302. A "crew" of seismic energy sources may include any type of source previously described. The crew may be composed of one or more fleets. Each fleet may include one or more energy source decoders 304 and energy sources 300. The crew may also have one or more energy source encoders 306. The encoder 306 may be used to implement communication and timing of events with the decoders 304. Each encoder 306 may be connected to control software implement in a suitable information processor, which is used to implement and coordinate the operations of the crew.

The nodes 302 for acquiring signals from sensors 308, e.g. geophones or solid-state sensors, are placed on the ground. These sensors 308 may detect the signal echoes injected into the ground from the energy sources 300. In one embodiment, the nodes 302 may be configured to continuously record the signal echoes during the times when seismic data acquisition operations take place. For example, the nodes 302 may be configured to sample the signal echoes from the sensors 308 at a specific rate (e.g. 4 milliseconds, 2 milliseconds, 1 millisecond, etc.). During operations, further user interaction with the autonomous nodes may or may not be needed.

Both the crew of energy source equipment and the autonomous nodes may be equipped with GPS receivers 310. The GPS receivers 310 may generate timing signals 312 to synchronize the timing of the operations between the energy source 300 and the nodes 302. The crew encoder 306 may be configured to start on a specified time boundary. As used herein, the time boundary refers to a designated sample rate or a multiple thereof to be used by the recording system of the node 302. For example, if the recording system of the node 302 is configured to have a time boundary of a 2 millisecond recording sample rate, the encoder 306 may be configured to start on a time boundary which is evenly divisible by 2 milliseconds. The encoder 306 may be configured with a count of 1 or more seconds (e.g. 1 to 64 seconds) and a subsequent count of time boundaries (e.g. 2, 4, 8, 16 milliseconds, etc.).

Figure 4A:
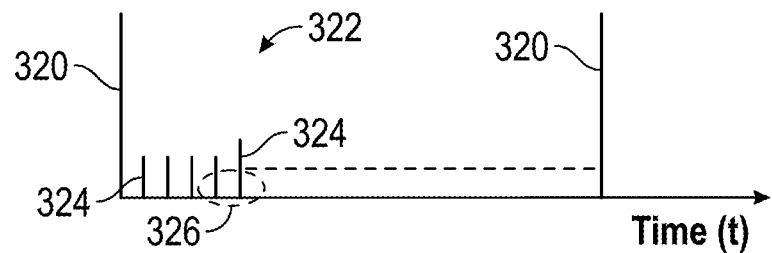
FIGS. 4A and 4B graphically illustrate a synchronization method according to one embodiment of the present disclosure.

Referring now to FIGS. 4A and B, the use of an exemplary synchronization method according to the present disclosure is graphically illustrated. In FIG. 4A, a pulse per second (PPS) 320 received by a GPS device 310 (FIG. 3) is shown along a timeline (t). Also shown along timeline (t) is a sampling rate 322 of a node 302 (FIG. 3). The sampling rate 322 may have time boundaries 324 of a specified time duration as described previously (e.g., 2 milliseconds). The time boundaries 324 are the time at which a sample is taken. It should be noted that the sampling rate is synchronized with the PPS 320. That is, a time boundary 324 is aligned in time with the PPS 320. An initiation of seismic operations beings with a start signal sent to the source encoder 306 (FIG. 3), which may be received during time period 326.

Figure 4B:
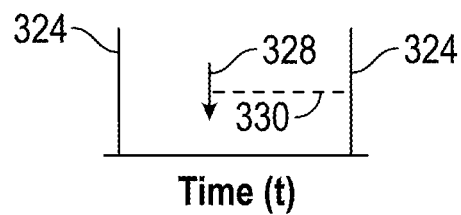

Referring now to FIG. 4B, the time period 326 is shown in expanded form to illustrate the location in time of the start signal 328, i.e., the start signal 328 is received between the time boundaries 324. If the energy source 300 (FIG. 3) were to start immediately, then an undesirable time gap 330 would be introduced into the data generated by the nodes 302. However, as discussed above, the source encoder 306 (FIG. 3) also has access to the PPS 320 (FIG. 4A). Thus, the source encoder 306 sends the command signal 314 (FIG. 3) to start the energy source 300 (FIG. 3) only at a time when a time boundary is known to exist; i.e., a count corresponding to a multiple of the sample rate and with reference to the PPS 320. By introducing a time delay equal to the time gap 330, the source 300 (FIG. 3) and the node 302 (FIG. 3) may be synchronized.

The encoder 306 may be started by a hardware switch closure in one non-limiting embodiment. The hardware switch closure may be initiated either manually by an operator or automatically by some an electronic apparatus. The encoder may have a button on the front panel for manually starting the hardware switch closure If started. Once the button is pushed, software may be used to generate start commands that are transmitted to the encoder 306.

Regardless of the source or form of the command to start the encoder 306, the encoder 306 may begin a countdown based upon the configuration specified above (e.g., sample rate). At the end of the countdown, the encoder 306 may begin a sequence, which will result in the transmission of a start command 314 that may be transmitted to at least one fleet or group of decoders 304. The transmission of the start command may be by wire or a wireless transmission. The transmitted command may initiate seismic operations (a sweep) within the decoders 304. The time required to transmit the command from the encoder 306 and when time $T_o$ occurs in both the encoder 306 and the decoders 304 in the Fleet may be a known, set value. So, $T_o$ may begin on a specified time boundary that is in sync with the nodes 302.

Alternatively, the encoder 302 and fleets of source decoders 304 may be configured to have a count of 1 or more seconds and a subsequent count of time boundaries (e.g. 2, 4, 8, 16 milliseconds, etc.). After receiving a start command, the encoder 306 may transmit the start command 314 to the fleet of source decoders 304. Both the encoder 306 and the fleet of source decoders 304 may begin counting down to the start of the seismic operations. A synchronized countdown may be conducted because the timing of the transmission from the encoder 304 to the fleet of source decoders 304 relative to the GPS timing signals is known. The actual start of the encoder and fleet may be synchronized on a time boundary that is synchronized with the nodes 302.

The actual start of seismic operations ("the sweep") by the encoder 304 to the fleet of source decoders 304 is known as "Time Zero" or "$T_0$" or "Time Break". This time "$T_o$" relative to GPS time may be recorded locally by the encoder 306 and decoders 304 within the fleet. At the end of the sweep, the performance statistics associated with the $T_0$ time, such as location coordinates and other information, may be collected and transmitted from the fleet of source decoders 304 to the encoder 306. The encoder 304 may pass this information to the control software (not shown) connected to the encoder 306.

The information from the fleet may be stored in the computer mass storage (not shown) for later retrieval and reports. The information stored within the computer mass storage characterizes or functionally describes the time and location of each sweep and of each decoder 304. Later, in a transcription process, the fleet $T_0$ time and location information may be used with the time and location information of the nodes 302 for finding and extracting the recorded signals stored in the nodes 302.

The physical locations of the seismic operations or where a sweep is to take place may be surveyed and recorded and stored as data. Each of these locations may be known as a "source point". The number of times a sweep is to be repeated by a fleet at each location may be specified and also stored as data. A control software programmed into an information processing device may be configured with this information and direct the seismic operations. The control software may be configured with the composition of the seismic crew with its fleets of decoders. Note that a central recording system is not required for the software or the crew to conduct seismic operations with the nodes 302.

In operation, as the fleets travel from source point to source point, the control software may interrogate each fleet in the crew to determine their location, as well as determining the fleets (if any) that are ready to begin a sweep. GPS status information may be received using a suitable GPS receiver for validating the time synchronization of the crew with the use of the control software. Once a fleet signals that it is ready to begin a sweep, the control software may validate the sweep to be done. Once this validation is complete, the control software may start the fleet with the methods specified above. After the number of sweeps to be performed at the source point have been completed, validated, and the performance data of the fleet stored, then the source point of the fleet may be removed from the list of required source points. These operations may continue until sweeps have been performed at all of the required source points.

Once the seismic operations are complete, the nodes 302 can be collected. The signal data from all the nodes 302 can be transferred to computer. Then the signal data from the nodes 302 can be found, extracted and annotated with the performance information from the seismic crew. This signal data is then stored into standard signal files and delivered to the client.

The above signal communications may be done wirelessly and/or with hardwires. The communication protocol may consist of an analog or digital protocol or method of synchronization.

Portions of the present disclosure pertaining to "software aspects" of the disclosure are used herein. These aspects include detailed description and claims in terms of logic, software or software implemented aspects typically encoded on a variety of media including, but not limited to, computer-readable media, machine-readable media, program storage media, or computer program product. Such media may be handled, read, sensed and/or interpreted by an information processing device. Those skilled in the art will appreciate that such media may take various forms such as cards, tapes, magnetic disks (e.g., floppy disk or hard drive) and optical disks (e.g., compact disk read only memory ("CD-ROM") or digital versatile (or video) disc ("DVD")). Any embodiment disclosed herein is for illustration only and not by way of limiting the scope of the disclosure or claims.

The term "information processing device," "processor," "computer," or "controller" as used herein includes, but is not limited to, any device that transmits, receives, manipulates, converts, calculates, modulates, transposes, carries, stores or otherwise utilizes information. In several non-limiting aspects of the disclosure, an information processing device includes a computer that executes programmed instructions for performing various methods.

The term "seismic devices" means any device that is used in a seismic spread, including, but not limited to sensors, sensor stations, receivers, transmitters, power supplies, control units, etc. The disclosure herein is provided in reference to particular embodiments and processes to illustrate the concepts and methods. Such particular embodiments and processes are not intended to limit the scope of the disclosure or the claims. All such modifications within the scope of the claims and disclaimers are intended to be part of this disclosure.

What is claimed is:

1. A method for controlling seismic data acquisition communication, comprising:
   synchronizing a sampling rate of at least one node configured to acquire seismic data with a GPS timing signal from a first GPS seismic device, wherein the sampling rate is defined by time boundaries;
   sending a start signal to one or more seismic decoders, the start signal initiating a synchronized countdown across the one or more seismic decoders having a delay that is with reference to a GPS timing signal from a second GPS device;
   receiving the start signal at the one more seismic decoders, wherein the one or more seismic decoders initiate the synchronized countdown upon receiving the start signal; and
   activating at least one seismic energy source disposed on the one or more seismic decoders at the end of the synchronized countdown, wherein the synchronized countdown ends at the occurrence of a time boundary of the sampling rate of the at least one node.

2. The method of claim 1, wherein an amount of delay is determined using a multiple of the sampling rate.

3. The method of claim 1, further comprising synchronizing the time boundaries with the GPS timing signal.

4. The method of claim 1, further comprising sending the start signal to the one or more seismic decoders at the occurrence of a time boundary.

5. A system for controlling seismic data acquisition communication, comprising:
   at least one node configured to acquire seismic data from at least one seismic sensor, the at least one node configured to synchronize a sampling rate of the node with a GPS timing signal from a first GPS seismic device, wherein the sampling rate is defined by time boundaries; and
   a seismic source encoder configured to send a start signal to one or more seismic decoders, the start signal initiating a synchronized countdown across the one or more seismic decoders having a delay that is with reference to a GPS timing signal from a second GPS device;
   wherein the one or more seismic decoders are configured to initiate the synchronized countdown upon receiving the start signal and activate at least one seismic energy source disposed on the one or more seismic decoders at the end of the synchronized countdown, wherein the synchronized countdown ends at the occurrence of a time boundary of the sampling rate of the at least one node.

6. The system of claim 5, wherein an amount of delay is determined using a multiple of the sampling rate.

7. The system of claim 5 wherein at least one of the at least one node and the seismic source encoder is configured to synchronize the time boundaries with the GPS timing signal.

8. The method of claim 5, wherein the seismic source encoder is further configured to send the start signal to the one or more seismic decoders at the occurrence of a time boundary.

9. A non-transitory machine-readable medium product with instructions thereon, that when executed by at least one processor, causes the at least one processor to perform a method for controlling seismic data acquisition communication, the method comprising:
   synchronizing a sampling rate of at least one node configured to acquire seismic data with a GPS timing signal from a first GPS seismic device, wherein the sampling rate is defined by time boundaries;
   sending a start signal to one or more seismic decoders, the start signal initiating a synchronized countdown across the one or more seismic decoders having delay that is with reference to a GPS timing signal from a second GPS device;
   receiving the start signal at the one more seismic decoders, wherein the one or more seismic decoders initiate the synchronized countdown upon receiving the start signal; and
   activating at least one seismic energy source disposed on the one or more seismic decoders at the end of the synchronized countdown, wherein the synchronized countdown ends at the occurrence of a time boundary of the sampling rate of the at least one node.

10. The non-transitory machine-readable medium product of claim 9, wherein an amount of delay is determined using a multiple of the sampling rate.

11. The non-transitory machine-readable medium product of claim 9, further comprising instructions thereon for synchronizing the time boundaries with the GPS timing signal.

12. The non-transitory machine-readable medium product of claim 9, further comprising instructions thereon for sending the start signal to the one or more seismic decoders at the occurrence of a time boundary.

* * * * *